United States Patent
Goto et al.

(10) Patent No.: US 10,272,956 B2
(45) Date of Patent: Apr. 30, 2019

(54) VEHICLE BODY STRUCTURE AND COATING METHOD OF VEHICLE BODY

(71) Applicant: HONDA MOTOR CO., LTD., Minato-Ku, Tokyo (JP)

(72) Inventors: Toshihiko Goto, Tokyo (JP); Yoshiharu Komatsu, Tokyo (JP)

(73) Assignee: Honda Motor Co., Ltd., Tokyo (JP)

(*) Notice: Subject to any disclaimer, the term of this patent is extended or adjusted under 35 U.S.C. 154(b) by 20 days.

(21) Appl. No.: 15/703,354

(22) Filed: Sep. 13, 2017

(65) Prior Publication Data
US 2018/0086389 A1 Mar. 29, 2018

(30) Foreign Application Priority Data

Sep. 23, 2016 (JP) .................................. 2016-185303

(51) Int. Cl.
| | | |
|---|---|---|
| *B62D 25/00* | (2006.01) | |
| *B62D 27/06* | (2006.01) | |
| *B60K 15/05* | (2006.01) | |
| *C25D 13/04* | (2006.01) | |

(Continued)

(52) U.S. Cl.
CPC ............ *B62D 27/065* (2013.01); *B60K 15/05* (2013.01); *C25D 13/04* (2013.01); *C25D 13/12* (2013.01); *B60K 15/0406* (2013.01); *B60K 2015/053* (2013.01); *B60K 2015/0553* (2013.01); *B60K 2015/0561* (2013.01); *B60K 2015/0576* (2013.01); *B60Y 2304/07* (2013.01)

(58) Field of Classification Search
CPC .. B62D 27/065; B60K 15/05; B60K 15/0406; B60K 2015/053; B60K 2015/0553; B60K 2015/0561; B60K 2015/0576; C25D 13/04; C25D 13/12; B60Y 2304/07
See application file for complete search history.

(56) References Cited

U.S. PATENT DOCUMENTS

| | | | | |
|---|---|---|---|---|
| 2,835,150 A | * | 5/1958 | Marcoux .................. | B21J 15/18 72/313 |
| 2016/0201707 A1 | * | 7/2016 | Wood ...................... | F16B 35/06 403/267 |
| 2016/0280048 A1 | * | 9/2016 | Friedman ............... | B60J 5/0468 |

FOREIGN PATENT DOCUMENTS

| | | | | |
|---|---|---|---|---|
| DE | 102012010335 A1 | * | 11/2013 | ............ B60K 15/05 |
| JP | H02-290997 A | | 11/1990 | |
| JP | H05-086496 A | | 4/1993 | |

(Continued)

OTHER PUBLICATIONS

Japanese Office Action, with the English machine translation thereof, dated Feb. 20, 2018 in the corresponding JP patent application 2016-185303.

*Primary Examiner* — Lori L Lyjak
(74) *Attorney, Agent, or Firm* — Carrier Blackman & Associates, P.C.; Joseph P. Carrier; Anne G. Sabourin

(57) ABSTRACT

A component that is assembled to a vehicle body can be temporarily fastened to a position different from an original assembling position, and can be favorably coated, without using a special jig. A fuel lid cover (33) is temporarily fastened to a rear door (43) that is different from a predetermined assembling position, with use of an opening portion (33K) of a hinge (33) that is attached to the fuel lid cover (32). Further, the vehicle body (10) is provided with a flange portion that functions as a step portion that forms a space between the hinge (33) of the fuel lid cover (32) and the vehicle body (10), when the fuel lid cover (32) is temporarily fastened.

7 Claims, 10 Drawing Sheets

(51) Int. Cl.
*C25D 13/12* (2006.01)
*B60K 15/04* (2006.01)

(56) References Cited

FOREIGN PATENT DOCUMENTS

JP        3251683 B2    1/2002
JP     2003-253494 A    9/2003

* cited by examiner

VEHICLE BODY STRUCTURE AND COATING METHOD OF VEHICLE BODY

INCORPORATION BY REFERENCE

The present application claims priority under 35 U.S.C. § 119 to Japanese Patent Application No. 2016-185303 filed on Sep. 23, 2016. The content of the application is incorporated herein by reference in its entirety.

BACKGROUND OF THE INVENTION

Field of the Invention

The present invention relates to a vehicle body structure for temporarily fastening a component that is assembled to a vehicle body to a position different from an original assembling position, and coating the component simultaneously with the vehicle body, and a coating method of a vehicle body.

Description of the Related Art

There is known an art of temporarily fastening a component that is assembled to a vehicle body to a position different from an original assembling position, and coating the component simultaneously with the vehicle body (refer to Japanese Patent No. 3251683, for example).

In Japanese Patent No. 3251683, a fuel lid cover is coated simultaneously with a vehicle body in a state in which the fuel lid cover is attached to a special jig, and the special jig is temporarily attached to a door.

SUMMARY OF THE INVENTION

However, the method in Japanese Patent No. 3251683 needs attachment and detachment work of the special jig, and work of transporting the special jig to an attaching location from a detached location to reuse the special jig. Further, in order to secure energization at a time of performing electrodeposition coating or electrostatic coating, work of removing a coating film adhering to the special jig each time is necessary, and much time and effort for maintenance and management are taken.

Thus, the present invention has an object to enable a component that is assembled to a vehicle body, to be temporarily fastened to a position different from an original assembling position, and enable the component to be favorably coated, without using a special jig.

In order to attain the above described object, the present invention is a vehicle body structure for temporarily fastening a component that is assembled to the vehicle body, to the vehicle body in a position different from a predetermined assembling position, and coating the component simultaneously with the vehicle body, wherein the component is provided with an opening portion for assembling the component to the vehicle body, and the component is temporarily fastened to the vehicle body with use of the opening portion, and a step portion that forms a space between the component and the vehicle body when the component is temporarily fastened to the vehicle body is provided.

In the above described configuration, the step portion may be provided at a door inner plate of the vehicle body or a tailgate inner plate.

Further, in the above described configuration, the step portion may be provided at a side having a fuel supply port, of a left and a right of the vehicle body.

Further, in the above described configuration, the step portion may be formed by a flange portion of a rivet nut that is attached to the vehicle body.

Further, in the above described configuration, the rivet nut may have a bottom with a tip end of the rivet nut closed.

Further, in the above described configuration, the rivet nut may be provided with a seal member that prevents communication of the rivet nut.

Further, in the above described configuration, the component may be a fuel lid cover that is provided with a hinge for assembling the component to the predetermined assembling position.

Further, the present invention is a method of temporarily fastening a component that is assembled to the vehicle body, to the vehicle body in a position different from a predetermined assembling position, and coating the component simultaneously with the vehicle body, and includes a temporary fastening step of temporarily fastening the component to the vehicle body by using an opening portion that is provided in the component and is for assembling the component to the vehicle body, and has a space formed by a step portion that forms the space between the component and the vehicle body at a time of the component being temporarily fastened, and a coating step of applying electrodeposition coating, intermediate coating and final coating to the vehicle body.

In the above described configuration, in the temporary fastening step, the component is temporarily fastened to the vehicle body by a fastening member, and the fastening member is detached after the coating step, and after the component is detached, the fastening member may be refastened to a same spot of the vehicle body.

In the present invention, the component that is assembled to the vehicle body is provided with the opening portion for assembling the component to the vehicle body, the component is temporarily fastened to the vehicle body with use of the opening portion, and the step portion that forms the space between the component and the vehicle body at the time of the component being temporarily fastened to the vehicle body is provided. Thereby, the component that is assembled to the vehicle body can be temporarily fastened to the position different from the assembling position, and can be properly coated by spreading the coating material to every corner by the space between the component and the vehicle body, without using a special jig.

Further, when the step portion is provided at the door inner plate of the vehicle body, or the tailgate inner plate, access can be easily made to the door inner plate or the tailgate inner plate by opening the door or the tailgate, and temporary fastening work is facilitated. Further, by opening and closing the door or the tailgate at the time of coating, both surfaces of the component that is temporarily fastened are easily coated.

Further, when the step portion is provided at the side having the fuel supply port, of the left and the right of the vehicle body, a moving amount at the time of attaching the component which is temporarily fastened, to the assembling position of a person or a device can be reduced, and efficiency such as reduction in time can be achieved.

Further, when the step portion is formed of the flange portion of the rivet nut that is attached to the vehicle body, operations of performing work such as pressing work for forming the step portion, and fixing the nut or the like are not needed.

Further, when the rivet nut has the bottom with the tip end of the rivet nut closed, even if water or the like from an outside enters, the water or the like does not pass through the rivet nut, and it becomes possible to take a measure against water leakage.

Further, when the rivet nut is provided with the seal member that prevents communication of the rivet nut, water or the like from the outside can be prevented from entering inside through the rivet nut, and it becomes possible to take the measure against water leakage.

Further, when the component is a fuel lid cover provided with the hinge for assembling the component to the predetermined assembling position, the opening portion of the hinge can be also used as the opening portion for temporary fastening, and the hinge can be coated simultaneously, so that time and effort for separately coating only the hinge is not needed.

Further, the present invention includes a temporary fastening step of temporarily fastening the component that is assembled to the vehicle body, to the vehicle body by using the opening portion that is provided in the component and is for assembling the component to the vehicle body, and having a space formed by a step portion that forms the space between the component and the vehicle body, at the time of the component being temporarily fastened, and a coating step of applying electrodeposition coating, intermediate coating and final coating to the vehicle body. Thereby, the component that is assembled to the vehicle body can be temporarily fastened to the position different from the assembling position, and can be favorably coated by spreading the coating material to every corner by the space between the component and the vehicle body, without using a special jig.

Further, when in the temporary fastening step, the component is temporarily fastened to the vehicle body by the fastening member, the fastening member is detached after the coating step, and after the component is detached, the fastening member is refastened to the same spot of the vehicle body, a situation in which water or the like from outside enters inside can be prevented by the fastening member, and it becomes possible to take the measure against water leakage.

DETAILED DESCRIPTION OF THE PREFERRED EMBODIMENTS

Hereunder, embodiments of the present invention will be described with reference to the drawings.

Figure 1:
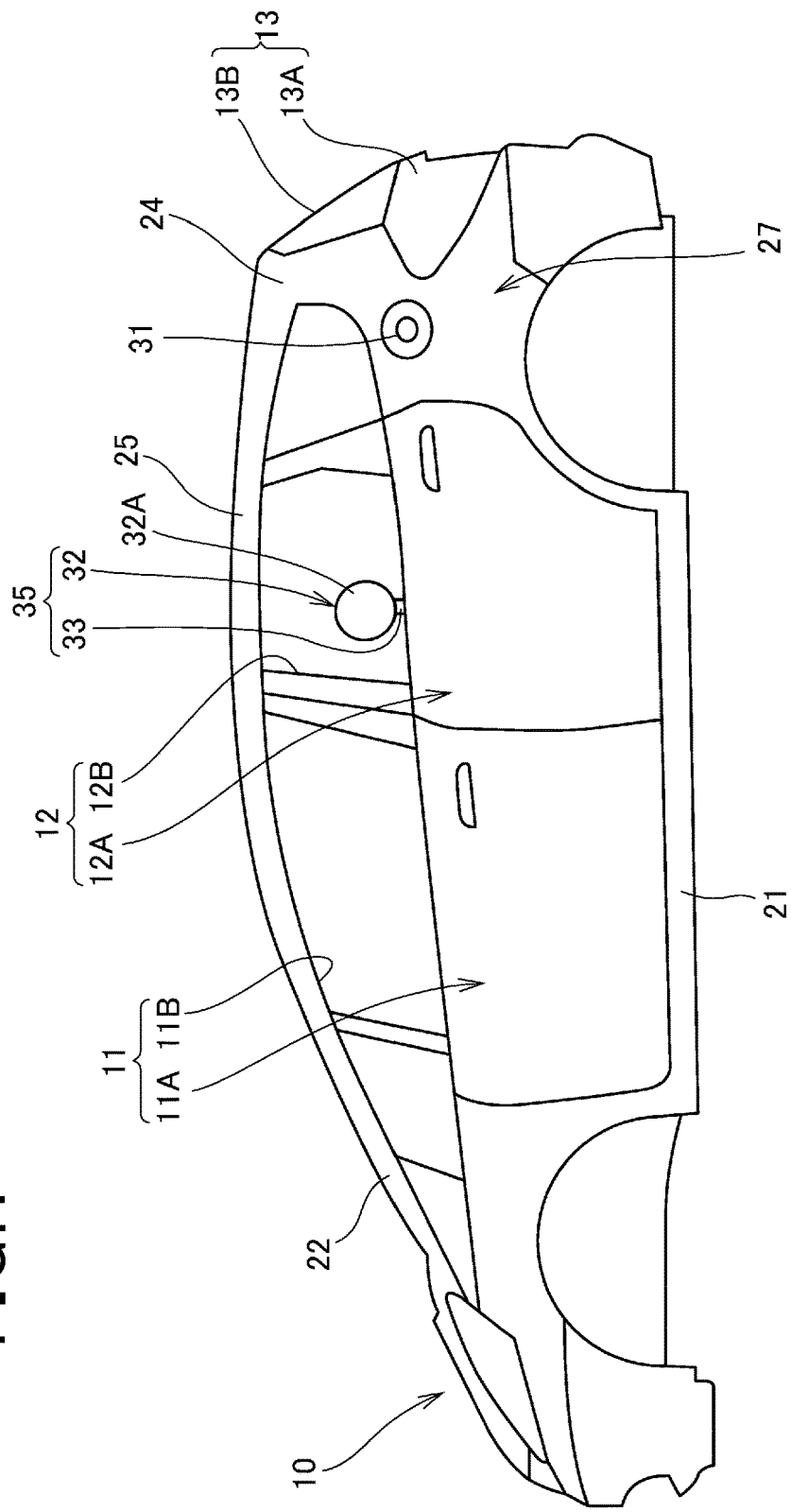
FIG. 1 is a side view of a vehicle body to which a coating method according to a first embodiment of the present invention is applied.

FIG. 1 is a side view of a vehicle body to which a coating method according to a first embodiment of the present invention is applied.

A vehicle body 10 is a vehicle of a five door type including left and right front doors 11, left and right rear doors 12, and a tailgate 13. In the present explanation, respective directions such as left and right and up and down correspond to directions seen from an occupant riding in a vehicle.

The vehicle body 10 includes left and right side sills 21 that extend in a vehicle body longitudinal direction, left and right front pillars 22 that are raised from front portions of the respective side sills 21, left and right center pillars (not illustrated) that are raised from longitudinal central portions of the respective side sills 21, left and right rear pillars 24 that are raised from rear portions of the left and right side sills 21, and left and right roof rails 25 that connect upper portions of the front pillars 22 and upper portions of the rear pillars 24. Further, the vehicle body 10 includes panels such as rear panels 27 that cover vehicle body rear side surfaces.

The left and right front doors 11 are hinge type opening and closing components that are mounted to the front pillars 22 to be openable and closable via hinges. Each of the front doors 11 includes a door main body 11A that covers a region surrounded by the side sill 21, the front pillar 22, the center pillar and the roof rail 25, and an opening portion (hereunder, a window opening portion) 11B for a window that is provided at the door main body 11A.

The left and right rear doors 12 are hinge type opening and closing components that are mounted to the center pillars to be openable and closable via hinges. Each of the rear doors 12 includes a door main body 12A that covers a region surrounded by the side sill 21, the center pillar, the rear pillar 24 and the roof rail 25, and an opening portion (hereunder, a window opening portion) 12B for a window that is provided at the door main body 12A.

Tailgate 13 is a hinge type opening and closing component that is mounted to a frame bridging rear ends of the roof rails 25 via a hinge (not illustrated) to be openable and closable. The tailgate 13 includes a tailgate main body 13A that covers a region that opens between the left and right rear pillars 24, and an opening portion (hereunder, a window opening portion) 13B for a window that is provided at the tailgate main body 13A.

The vehicle body 10 illustrated in FIG. 1 is formed of only metal components such as steel plates, and metal pipes, and coating such as electrodeposition coating is applied by a coating line that will be described later. Further, after the coating, interior panels of a resin, various mechanisms and the like are mounted to respective parts of the vehicle body 10.

Specifically, windowpanes, hoisting and lowering mechanisms that hoist and lower the windowpanes, lock mechanisms that lock the respective doors 11 and 12 to the vehicle body 10 and the like are mounted to the respective doors 11 and 12, and further, the interior panels are mounted to insides (vehicle inner sides) of the respective doors 11 and 12. A windowpane, a wiper mechanism that operates a wiper, a lock mechanism, lights and the like are mounted to the tailgate 13, an interior panel is mounted to an inside (vehicle inner side) of the tailgate 13.

As illustrated in FIG. 1, a fuel filling port 31 to be a supply port for liquid fuel is provided on the rear panel 27 at a left side. The oil filling port 31 is a spot that is covered with a fuel lid cover 32 to be openable and closable. Note that FIG. 1 illustrates a state in which the fuel lid cover 32 is temporarily fastened to the vehicle body 10 in a position different from an original assembling position (a position for covering the fuel filling port 31).

In FIG. 1, the fuel lid cover 32 is temporarily fastened to the rear door 12 at the left side which is the closest to the original assembling position of the fuel lid cover 32, among the front doors 11, the rear doors 12 and the tailgate 13 which are hinge type opening and closing components. More specifically, the fuel lid cover 32 is disposed in a position of the window opening portion 12B of the rear door 12 at the left side, in a posture in which a front surface 32A of the fuel lid cover 32 is faced to a left side (vehicle body outer side).

In the present embodiment, the fuel lid cover 32 and the vehicle body 10 are coated simultaneously by applying coating to the vehicle body 10 illustrated in FIG. 1. Thereby, not only coating can be applied in a short time period, but also coating colors are easily matched by causing the coating conditions of the fuel lid cover 32 and the vehicle body 10 to coincide with each other, as compared with a case where the fuel lid cover 32 and the vehicle body 10 are separately coated.

Note that the coating conditions that can be caused to coincide with each other are, for example, spraying distances of a coating material, coating temperatures, states of the coating material and the like. Further, by opening the rear door 12, work of coating a back surface 32B (FIG. 2 and the like that will be described later) of the fuel lid cover 32 can be performed easily.

Next, the fuel lid cover 32 will be described with a peripheral configuration.

Figure 2:
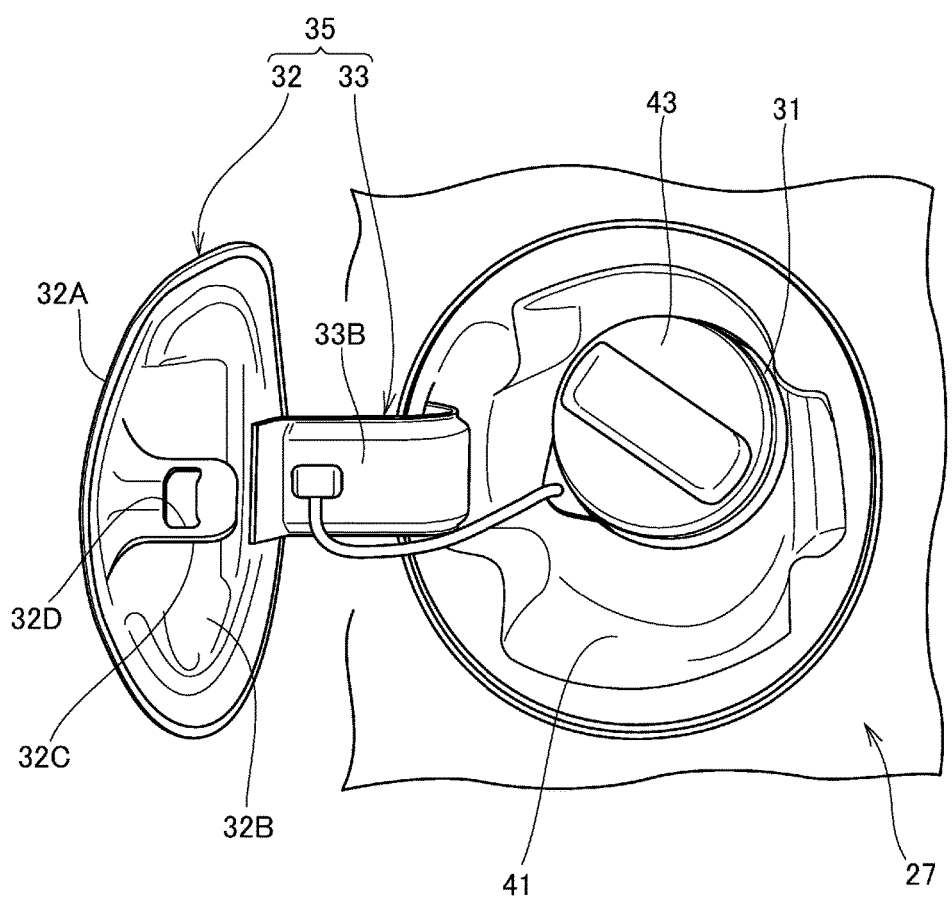
FIG. 2 is a view illustrating a state in which a fuel lid cover is assembled to an original assembling position, with a peripheral configuration.

FIG. 2 is a view illustrating a state in which the fuel lid cover 32 is assembled to the original assembling position, with the peripheral configuration.

The rear panel 27 is provided with a fuel adapter 41 that is formed into a recessed shape, and the oil filling port 31 is formed in the fuel adapter 41, and the fuel lid cover 32 is supported at the fuel adapter 41 via the hinge 33 to be openable and closable.

The fuel lid cover 32 is formed into a cover shape that covers an opening portion formed by the fuel adapter 41 substantially without a space. On a back surface 32B of the fuel lid cover 32, a lock portion 32C for keeping the fuel lid cover 32 in a closed state is provided. The front surface 32A of the fuel lid cover 32 is an outer appearance composing surface that is exposed to an outer appearance of the vehicle body 10 when the fuel lid cover 32 is closed.

The lock portion 32C has a locking hole 32D to which a lock mechanism not illustrated is locked. The lock mechanism is locked to the locking hole 32D in a state in which the fuel lid cover 32 is closed, whereby the fuel lid cover 32 is kept in the closed state.

A filler cap 43 is attached to the fuel filling port 31 to be attachable and detachable, and the fuel filling port 31 is opened by the filler cap 43 being detached at a time of filling fuel.

A hinge 33 of the fuel lid cover 32 includes a hinge base 33A (FIG. 3 that will be described later) that is fastened and fixed to the fuel adapter 41 by a fastening member not illustrated, and a hinge movable piece 33B that is swingably attached to the hinge base 33A via a hinge pin. The fuel lid cover 32 is integrated with the hinge 33 by being attached to the hinge movable piece 33B. Hereunder, the integrated component will be described as "a fuel lid cover unit 35".

In the present embodiment, the fuel lid cover 32 is temporarily fastened to the rear door 12 by fastening and fixing the fuel lid cover unit 35 to the rear door 12 by using an opening portion 33K (FIG. 3 that will be described later) through which a fastening member for fastening the hinge base 33A to the fuel adapter 41 passes.

Figure 3:
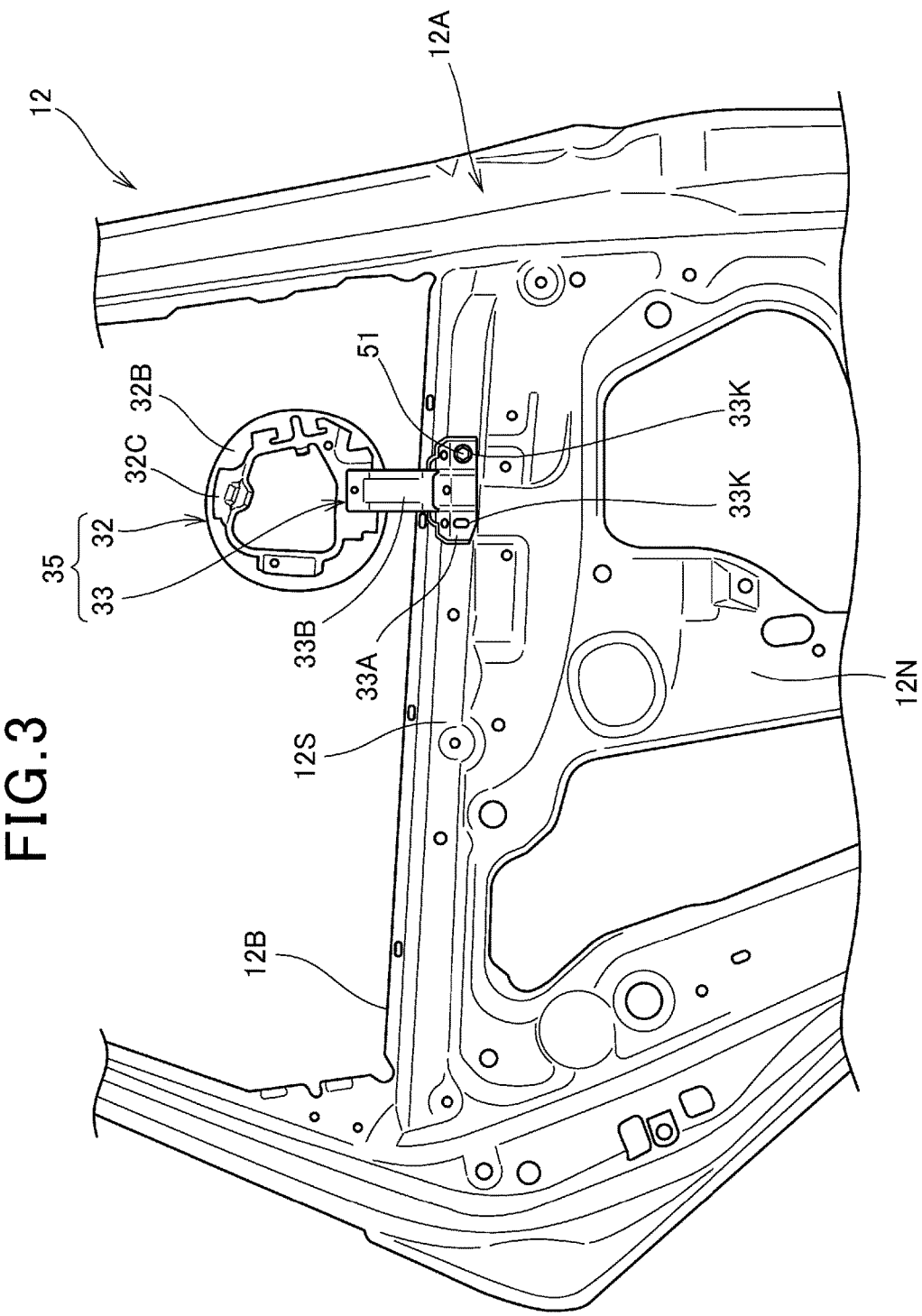
FIG. 3 is a view of a rear door at a left side illustrated in FIG. 1 seen from a back side with a fuel lid cover unit.

FIG. 3 is a view of the rear door 12 at the left side illustrated in FIG. 1 seen from a back side (vehicle inner side), with the fuel lid cover unit 35.

As illustrated in FIG. 3, the hinge base 33A of the fuel lid cover unit 35 has two opening portions 33K. A bolt 51 that functions as a fastening member is passed through one of the opening portions 33K, and the bolt 51 is fastened to the rear door 12, whereby the fuel lid cover unit 35 is fixed to the rear door 12.

In a case of this fixing structure, an attaching position of the hinge base 33A is changeable within a range in which the hinge base 33A is rotatable with the single bolt 51 as a reference. Accordingly, it is possible to adjust a fixing position of the hinge base 33A finely so that the fuel lid cover 32 is located in the window opening portion 12B.

Further, the fuel lid cover 32 can be swung in a vehicle body lateral direction with respect to the rear door 12 by the hinge 33, and therefore, it is also possible to adjust a position of the fuel lid cover 32 finely so that the front surface 32A of the fuel lid cover 32 is along a surface on a vehicle body outer side, of the rear door 12.

By using the hinge 33 of the fuel lid cover unit 35 in this way, the fuel lid cover 32 is attached to the rear door 12, and the attaching position of the fuel lid cover 32 can be finely adjusted, without using a special jig.

Here, the door main body 12A of the rear door 12 has a door outer plate (also referred to as an outer panel) that is exposed to the vehicle body outer side, and a door inner plate (also referred to as an inner panel) 12N (FIG. 3) that is provided on a vehicle body inner side of the door outer plate. The door inner plate 12N is provided with a rivet nut 52 (FIG. 4 that will be described later) that functions as a fastened portion to which the above described bolt 51 is fastened.

Describing in detail, on the door inner plate 12N of the present configuration, a shoulder plane portion 12S that extends in a longitudinal direction along a lower edge of the window opening portion is provided at a lower side and in a vicinity of the lower edge of the window opening portion 12B. The rivet nut 52 (FIG. 4) is provided at the shoulder plane portion 12S.

The shoulder plane portion 12S is formed into a rib shape that protrudes to the vehicle body inner side, and therefore, can avoid a situation where the hinge base 33A contacts a spot other than the shoulder plane portion 12S when the hinge base 33A is attached to the shoulder plane portion 12S. Further, by the rib shape of the shoulder plane portion 12S, the shoulder plane portion 12S becomes a spot with relatively high strength, and can efficiently ensure support rigidity for the fuel lid cover unit 35.

Note that the spot at which the hinge base 33A is attached does not have to be limited to the shoulder plane portion 12S. The hinge base 33A may attached at a spot other than the shoulder plane portion 12S, when the fuel lid cover 32 cannot be disposed at the position illustrated in FIG. 3 if the hinge base 33A is attached to the shoulder plane portion 12S, or when a spot other than the shoulder plane portion has a space to which the hinge base 33A can be attached without contacting the other members, for example.

Figure 4:
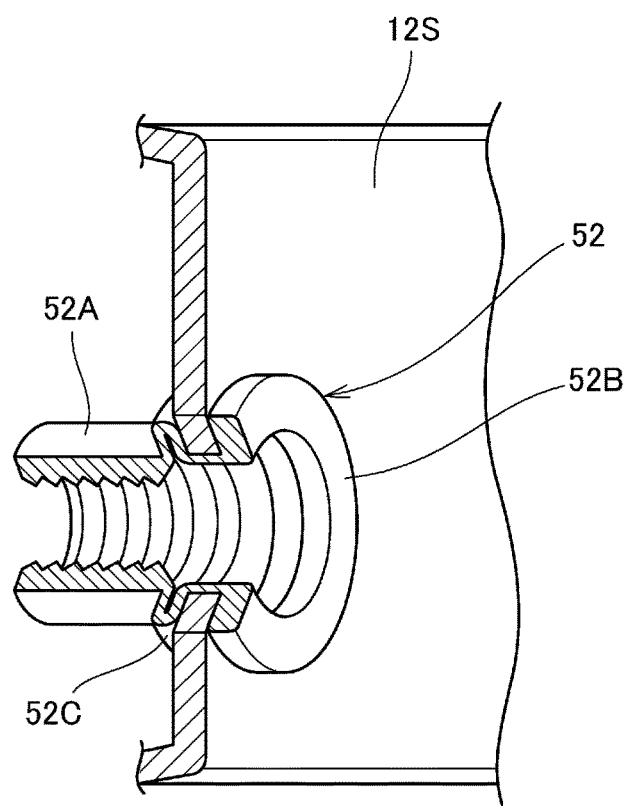
FIG. 4 is a view illustrating a rivet nut with a shoulder plane portion.

FIG. 4 is a view illustrating the rivet nut 52 with the shoulder plane portion 12S.

The rivet nut 52 integrally has a nut portion 52A having a female screw, and a flange portion 52B that extends outward in a radial direction from the nut portion 52A at a base end of the nut portion 52A. The rivet nut 52 is formed into a penetration type that penetrates in an axial direction from a tip end to the base end.

FIGS. 5A to 5E are views illustrating an attaching method of the rivet nut 52, and FIGS. 5A to 5E illustrate the attaching method in a chronological order.

Figure 5A:
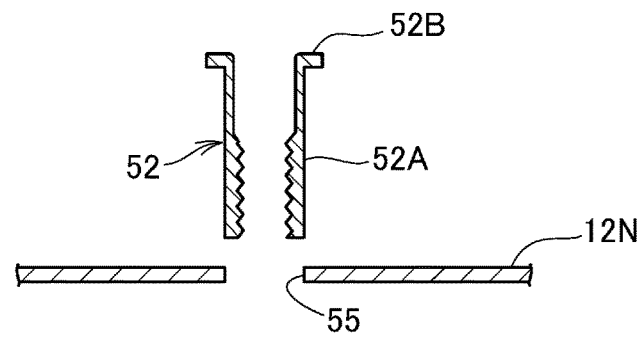
FIGS. 5A to 5E are views illustrating a method of attaching the rivet nut in a chronological order.
Figure 5B:
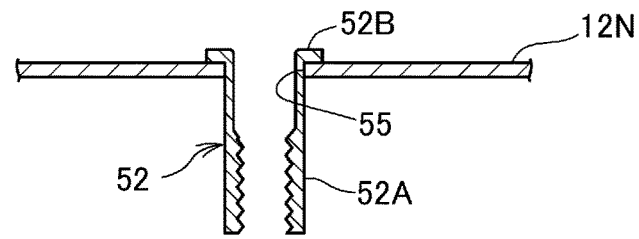

As illustrated in FIG. 5A, a through-hole 55 is provided in a predetermined position in the door inner plate 12N of the rear door 12, and the rivet nut 52 is inserted into the through-hole 55 from the vehicle body inner side. As illustrated in FIG. 5B, the flange portion 52B of the rivet nut 52 is locked to the door inner plate 12N to be prevented from coming off, and only the nut portion 52A is located inside the door inner plate 12N.

Here, as the through-hole 55 in which the rivet nut 52 is inserted, in a case where a hole is opened in advance in a suitable position for attachment of the hinge base 33A, the hold is usable. That is, as illustrated in FIG. 3, holes are provided in a plurality spots in the door inner plate 12N for the reason of manufacture or the like, and any one of the holes may be used as the through-hole 55 for the rivet nut 52.

Figure 5C:
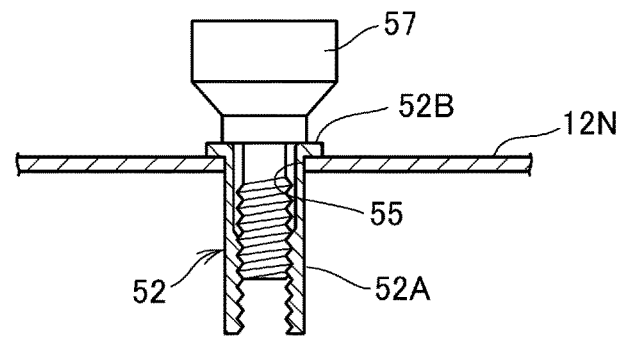
Figure 5D:
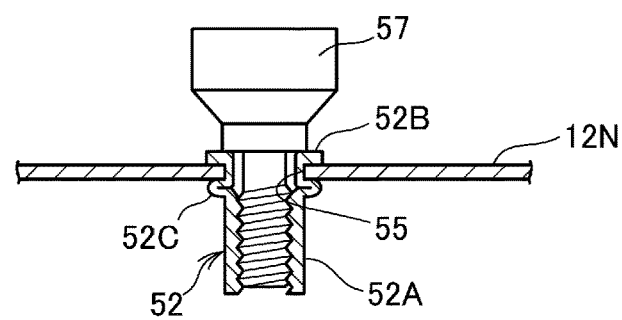
Figure 5E:
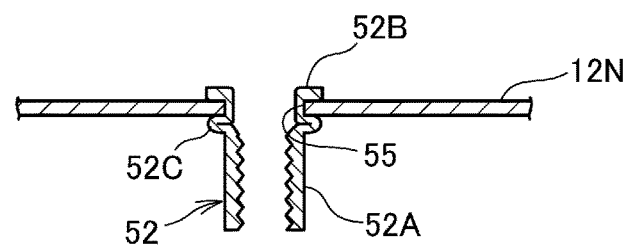

As illustrated in FIG. 5C, a predetermined tool 57 is inserted into the rivet nut 52 from inside (the vehicle inner side), and a male screw of the tool 57 is screwed into the nut portion 52A. Subsequently, by rotating the tool 57 in a fastening direction, a boundary portion between the flange portion 52B and the nut portion 52A in the rivet nut 52 bends, and a portion 52C that projects outward in the radial direction is formed. The door inner plate 12N is held by the projected portion 52C and the flange portion 52B, and therefore, it becomes possible to fix the rivet nut 52 to the door inner plate 12N as illustrated in FIG. 5E.

In this way, the rivet nut 52 can be easily attached to the door inner plate 12N from the vehicle inner side. Accordingly, even after assembly of the rear door 12, it becomes possible to attach the rivet nut 52 to the rear door 12 easily.

Figure 6:
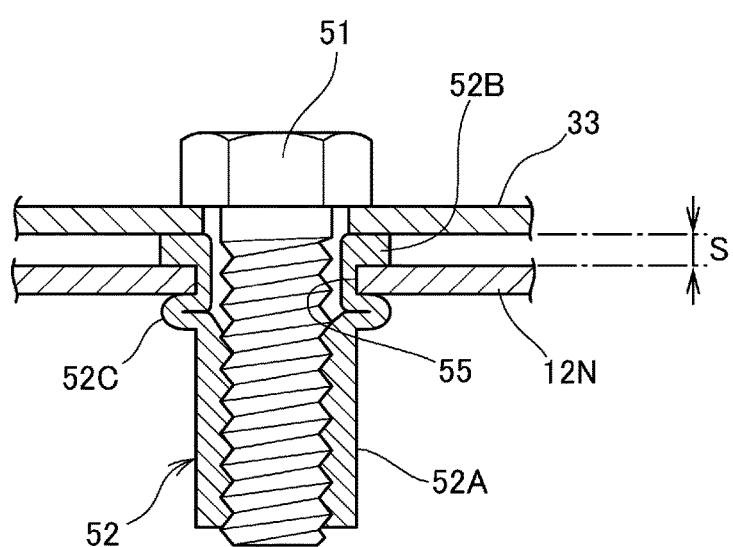
FIG. 6 is a side sectional view of a state in which a hinge base is fixed to a door inner plate by using the rivet nut and a bolt.

FIG. 6 is a side sectional view of a state in which the hinge base 33A is fixed to the door inner plate 12N by using the rivet nut 52 and the bolt 51.

As illustrated in FIG. 6, the rivet nut 52 is provided with the flange portion 52B, and therefore the flange portion 52B functions as a step portion that forms a space S between the fuel lid cover unit 35 and the vehicle body 10. The space S is set as a space that allows a coating material to enter between the fuel lid cover unit 35 and the vehicle body 10 sufficiently. Thereby, the coating material is allowed to enter between the fuel lid cover unit 35 and the vehicle body 10 sufficiently, and the coating material can be allowed to spread to every corner.

Figure 7:
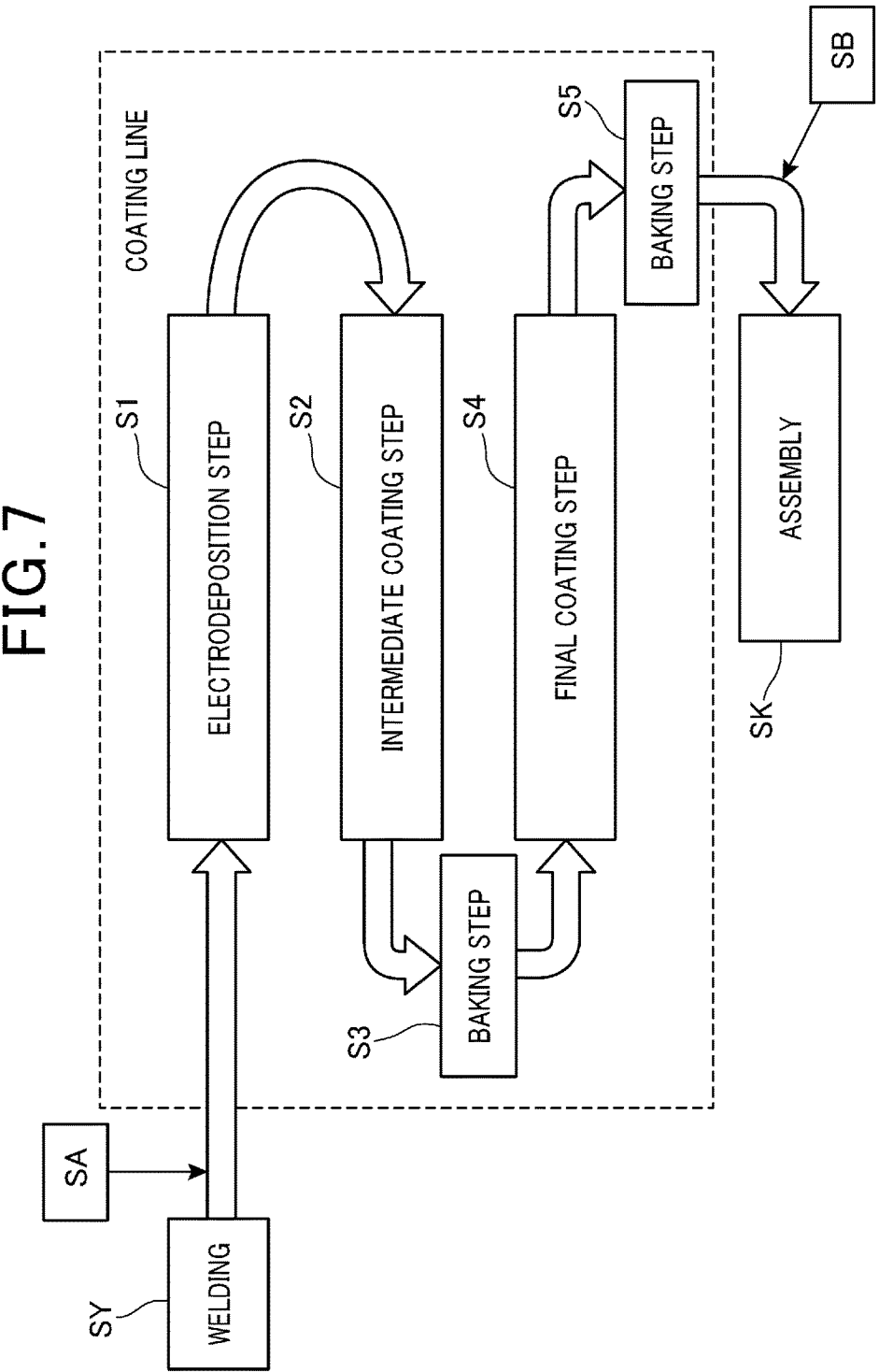
FIG. 7 is a diagram illustrating an example of a coating line.

FIG. 7 illustrates an example of a coating line (coating process) of the vehicle body 10.

A vehicle body that has gone through welding treatment (illustrated by reference sign SY in FIG. 7) is inputted to the coating line, and an electrodeposition step S1 of applying electrodeposition coating, an intermediate coating step S2 of applying intermediate coating, a baking step S3, a final coating step S4 of applying final coating, and a baking step S5 are carried out in this sequence. In the present embodiment, at least at timing before inputting the vehicle body to the electrodeposition step S1 (a temporary fastening step illustrated by reference sign SA in FIG. 7, for example), the fuel lid cover unit 35 is temporarily fastened to the rear door 12 by using the opening portion 33K (FIG. 3) of the hinge base 33A.

In the electrodeposition step S1, a cationic electrodeposition coating material (a coating material having an epoxy resin as a main component, for example) with a high dust resistant ability is coated by electrodeposition. Since the flange portion 52B of the rivet nut 52 functions as the step portion that forms the space S between the fuel lid cover unit 35 and the vehicle body 10 as described above, the coating material spreads to every corner of the fuel lid cover unit 35 and the vehicle body 10, and electrodeposition coating can be applied to every corner of the fuel lid cover unit 35 and the vehicle body 10.

In the intermediate coating step S2, a predetermined intermediate coating material is coated on a surface to which the electrodeposition coating is applied. In the intermediate coating step S2, the respective doors 11 and 12 and the like are opened and closed by a worker or a working robot, and are coated in an opened state and a closed state respectively. At the time of the coating, the coating material also spreads to every corner of the fuel lid cover unit 35 and the vehicle body 10 by the space S between the fuel lid cover unit 35 and the vehicle body 10. In the baking step S3, heat treatment for a predetermined time period is performed at a predetermined temperature by using a dry furnace, and thereby the intermediate coating material is dried and cured.

In the final coating step S4, on the surface to which the intermediate coating material is applied, a base coating material of the final coating materials is coated, and further, a clear coating material of the final coating materials is coated. In the final coating step S4, the respective doors 11, 12 and the like are also opened and closed by the worker or the working robot, and are coated in the opened state and the closed state respectively, as in the intermediate coating step S2. At the time of the coating, the coating material also spreads to every corner of the fuel lid cover unit 35 and the vehicle body 10 by the space S between the fuel lid cover unit 35 and the vehicle body 10. In the baking step S5, heat treatment for a predetermined time period is performed at a predetermined temperature by using a dry furnace, and thereby the final coating materials are dried and cured.

By the above coating process, coating on the fuel lid cover unit 35 and the vehicle body 10 are simultaneously carried out, and coating can be performed with the coating conditions (the coating temperatures, the states of the coating materials and the like) of the fuel lid cover unit 35 and the vehicle body 10 caused to coincide with one another. Thereby, the coating colors of the fuel lid cover unit 35 and the vehicle body 10 can be matched.

In particular, as illustrated in FIG. 1, the rear panel 27 at the left side of the vehicle body 10 and the front surface 32A of the fuel lid cover 32 are disposed in positions close to each other and in the same orientation, so that the spraying distances, the coating temperatures and the states of the coating materials are caused to coincide with one another, and the coating colors of the rear panel 27 and the front surface 32A of the fuel lid cover 32 can be matched with high precision.

Note that if the fuel lid cover 32 is assembled to the original assembling position and is coated simultaneously with the vehicle body 10, there arises a need to open and close the fuel lid cover 32 during the coating process. At the time of coating, a mechanism for opening and closing the fuel lid cover 32 is not incorporated, and therefore, it is difficult to open and close the fuel lid cover 32. In contrast with this, in the present embodiment, an effect that the operation of opening and closing the fuel lid cover 32 at the coating time becomes unnecessary is also obtained.

After the coating, an assembling process (illustrated by reference sign SK in FIG. 7) of assembling predetermined components (the above described interior panels and various mechanisms) to the vehicle body 10, and performing a predetermined inspection and the like is carried out. Further, at least after the coating is finished, for example, at the timing (a step illustrated by reference sign SB in FIG. 7) before the assembling process SK after the baking step S5, work of detaching the bolt 51 from the rivet nut 52 to detach the fuel lid cover unit 35, and thereafter, refastening the detached bolt 51 to the same rivet nut 52 is carried out.

The bolt 51 is fastened to the rivet nut 52, and thereby the rivet nut 52 does not communicate in an axial direction. Consequently, even if water or the like from outside enters into the rivet nut 52, the water or the like does not enter into the rear door 12. That is, the bolt 51 functions as a seal member that prevents communication of the rivet nut 52.

Note that a region including the rivet nut 52 is covered with the interior panel (not illustrated) and the like, and therefore is not exposed on the inside of the vehicle after the assembling process SK.

As described above, in the present embodiment, the fuel lid cover 32 which is the component that is assembled to the vehicle body is temporarily fastened to the rear door 12 that is different from the predetermined assembling position, with use of the opening portion 33K of the hinge 33 which is attached to the fuel lid cover 32. Further, the vehicle body 10 is provided with the flange portion 52B which functions as the step portion that forms the space S (FIG. 6) between the hinge 33 of the fuel lid cover 32 and the vehicle body 10 when the fuel lid cover 32 is temporarily fastened.

According to the vehicle body structure, the fuel lid cover 32 is temporarily fastened to the position different from the assembling position, and the fuel lid cover 32 can be coated simultaneously with the vehicle body 10, without using a special jig. Thereby, work of transporting the special jig, work of removing the coated film adhering to the special jig and the like become unnecessary, and time and effort for maintenance and management of the special jig can be reduced.

In addition, the space S is formed between the hinge 33 of the fuel lid cover 32 and the vehicle body 10, so that the coating materials can be spread to every corner of the respective parts including a space between the hinge 33 and the vehicle body 10, and time and effort for recoating and the like can be omitted.

Thereby, the component which is assembled to the vehicle body 10 can be temporarily fastened to the position different from the assembling position, and can be coated favorably, without using a special jig.

The rivet nut 52 having the flange portion 52B which functions as the step portion is provided at the door inner plate 12N (FIG. 3) of the vehicle body 10. Access can be easily made to the door inner plate 12N by opening the rear door 12, and temporary fastening work is facilitated. Further, by opening and closing the rear door 12 at the time of coating, both the surfaces 32A and 32B of the component (the fuel lid cover 32) which is temporarily fastened can be easily coated.

Further, the rivet nut 52 is provided at a side having the fuel filling port 31 which functions as the fuel supply port, of the left and right of the vehicle body 10. Thereby, the coating conditions (the coating temperatures, the states of the coating materials and the like) of the side surface having the fuel supply port of the vehicle body 10, and the fuel lid cover 32 can be matched. Furthermore, a moving amount at the time of attaching the fuel lid cover 32 to the position of the fuel filling port 31 which is the assembling position for a person or a device can be made minimum, and efficiency such as reduction in time period can be achieved.

Further, the fuel lid cover 32 is temporarily fastened to the rear door 12 which is the hinge type opening and closing component, so that the fuel lid cover 32 can be disposed in a position close to the final assembling position, which is advantageous in matching the coating colors with the periphery of the assembling position. Further, as described above, by opening and closing the rear door 12, both the surfaces 32A and 32B of the fuel lid cover 32 can be easily coated.

Further, the step portion is formed by the flange portion 52B of the rivet nut 52, and therefore, operations of performing work such as pressing work, and fixing a nut and the like to form the step portion are not needed.

Further, the bolt 51 is fastened to the rivet nut 52, as a seal member that prevents communication of the rivet nut 52, and therefore even if the rivet nut 52 is of a penetration type that penetrates in the axial direction, water or the like from the outside can be prevented from passing through the rivet nut 52 to enter the inside. Thereby, it becomes possible to take the measure against water leakage.

Note that the above described seal member is not limited to the bolt 51, and it is also possible to apply another member such as a blind plug.

Further, in the present embodiment, the fuel lid cover 32 which is provided with the hinge 33 to be assembled to the assembling position is temporarily fastened to the vehicle body 10. Thereby, the opening portion 33K of the hinge 33 can be also used as the opening portion for temporary fastening, and the hinge 33 can be coated simultaneously, so that time and effort that are taken to coat only the hinge 33 separately are not necessary. Further, an operation of opening and closing the fuel lid cover 32 at the time of coating is not necessary.

Further, the coating method of the present embodiment includes a temporary fastening step of temporarily fastening the fuel lid cover 32 which is the component that is assembled to the vehicle body 10 to the rear door 12 which is different from the predetermined assembling position by using the opening portion 33K of the hinge 33 which is attached to the fuel lid cover 32, and having the space S formed between the hinge 33 of the fuel lid cover 32 and the vehicle body 10 by the flange portion 52B which functions as the step portion at the time of the fuel lid cover 32 being temporarily fastened, and the coating step of applying the electrodeposition coating, the intermediate coating and the final coating to the vehicle body 10.

According to the coating method, the fuel lid cover 32 can be temporarily fastened to the position different from the assembling position, and can be favorably coated, without using a special jig.

Further, in the temporary fastening step, the fuel lid cover 32 is temporarily fastened to the vehicle body 10 by the bolt 51 which is the fastening member, the bolt 51 is detached after the coating step, and after the fuel lid cover 32 is detached, the bolt 51 is refastened to the same spot of the vehicle body 10 as a temporary fastening spot (spot) to which the bolt 51 is fastened in the temporary fastening step. Thereby, communication of the spot (the rivet nut 52) to which the bolt 51 is fastened can be prevented. Accordingly, the situation in which water or the like from the outside enters the inside can be prevented, and it becomes possible to take the measure against water leakage.

Note that in the present embodiment, the case of temporarily fastening the fuel lid cover 32 to the rear door 12 at the left side is described, but the present invention is not limited to this, and the fuel lid cover 32 may be temporarily fastened to the rear door 12 at the right side. Further, in a case of the vehicle body 10 in which the rear door 12 is configured to be a slide door, it is conceivable that when the fuel lid cover 32 is temporarily fastened to the rear door 12, the back surface 32B of the fuel lid cover 32 may be difficult to coat even if the rear door 12 is opened and closed. In this case, the fuel lid cover 32 is preferably fastened to the front door 11 temporarily.

Here, the front door 11 is of the substantially same structure as the hinge type rear door 12. That is, the door main body 11A of the front door 11 includes a door outer plate (an outer panel) that is exposed to the vehicle body outer side, and a door inner plate (an inner panel) that is provided on the vehicle body inner side of the door outer plate. Thereby, by attaching the rivet nut 52 to the door inner plate as in the case of the aforementioned rear door 12, the fuel lid cover 32 can be easily fastened to the front door 11 temporarily.

In a case where the fuel lid cover 32 is temporarily fastened to the front door 11, it is also preferable to dispose the fuel lid cover 32 in a position of the window opening portion 11B of the front door 11 at the left side, and in a posture with the front surface 32A of the fuel lid cover 32 facing a left side (the vehicle body outer side).

Figure 8:
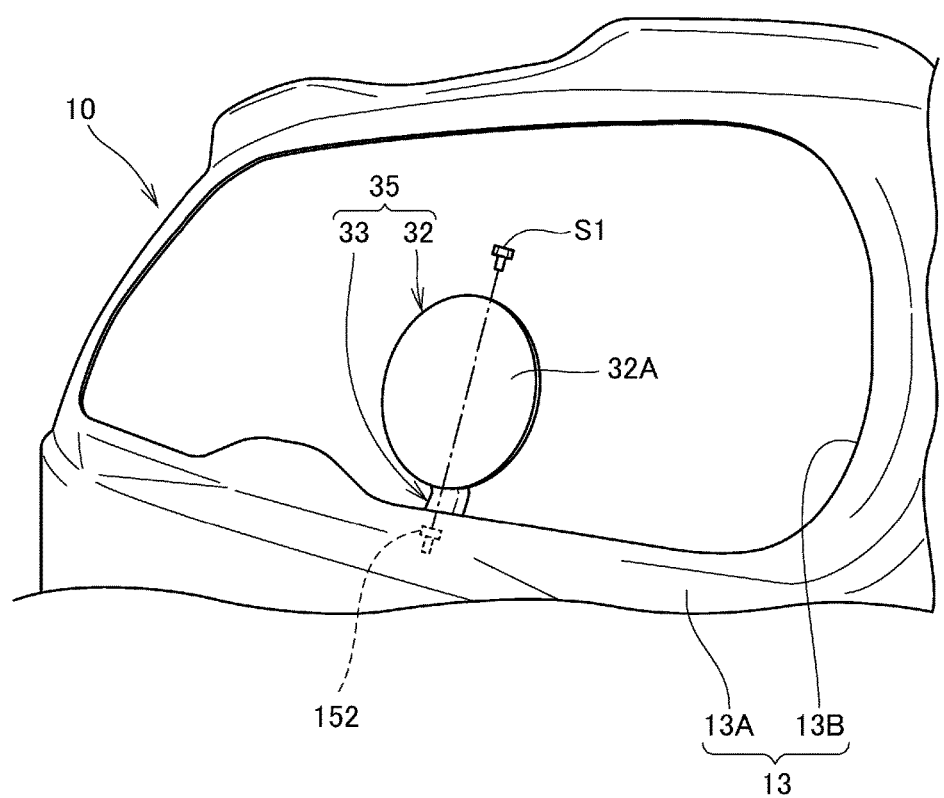
FIG. 8 is a view illustrating a tailgate of a vehicle body to which a coating method according to a second embodiment of the present invention is applied.

FIG. 8 is a view illustrating the tailgate 13 of the vehicle body 10 to which a coating method according to a second embodiment of the present invention is applied.

The second embodiment differs from the first embodiment in that the fuel lid cover 32 is provided at the tailgate 13 which is relatively close to the rear panel 27 which is the original assembling position.

Here, the tailgate main body 13A of the tailgate 13 is of the substantially same structure as the hinge type rear door 12. That is, the tailgate main body 13A includes a tailgate outer plate (an outer panel) that is exposed to the vehicle body outer side, and a tailgate inner plate (an inner panel) that is provided at the vehicle body inner side of the tailgate outer plate.

Since the tailgate 13 is provided with the wiper mechanism, a rivet nut 152 for fastening the wiper mechanism with a fastening member such as a bolt is attached to the tailgate inner plate as illustrated in FIG. 8. The rivet nut 152 is provided at a lower side and in a vicinity of a lower edge of the window opening portion 13B of the tailgate 13.

In the present embodiment, the fuel lid cover 32 is temporarily fastened to the rivet nut 152 by using the bolt 51. Thereby, the fuel lid cover 32 can be easily disposed in the position of the window opening portion 13B of the tailgate 13 and in the posture with the front surface 32A of the fuel lid cover 32 faced to the rear side (the vehicle body outer side).

According to the above configuration, the rivet nut 152 for the wiper mechanism can be also used as the rivet nut for temporarily fastening, and the fuel lid cover 32 can be disposed in the position close to the original assembling position, which is advantageous for matching the coating color with the periphery of the original assembling position. Further, by opening the tailgate 13, an effect of facilitating coating work of the back surface 32B and the like of the fuel lid cover 32 can be also expected.

Figure 9:
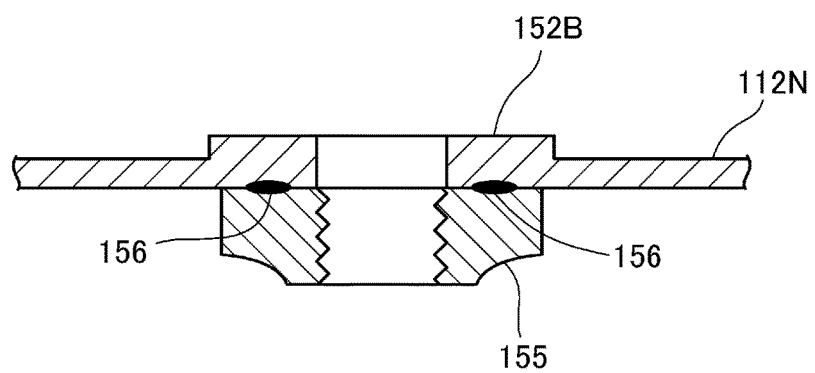
FIG. 9 is a view illustrating a step portion that is applied to a coating method according to a third embodiment of the present invention.

FIG. 9 is a view illustrating a step portion 152B that is applied to a coating method according to a third embodiment of the present invention.

The step portion 152B is formed integrally with a steel plate 112N by performing press forming to give a recessed and protruded shape corresponding to the step portion 152B, to the steel plate 112N corresponding to the door inner plate or the tailgate inner plate. Further, a female screw component 155 having a female screw such as a nut is joined to a back surface of a region corresponding to the step portion 152B by welding or the like.

Note that in FIG. 9, reference sign 156 denotes a joint spot. Thereby, the step portion 152B, and the female screw portion to which the bolt 51 for temporarily fastening the fuel lid cover 32 is fastened can be provided without using the rivet nut 52. According to the configuration, the step portion 152B can be formed simultaneously at the time of press-forming the door inner plate or the tailgate inner plate, for example.

Note that instead of the method that joins the female screw component 155 to the back side of the step portion 152B, a male screw component such as a bolt may be provided at a step portion 152B side. In this case, the male screw component which is provided at the step portion 152B side is passed through the opening portion 33K at the fuel lid cover 32 side, and a female screw component such as a nut is fastened to the male screw component, whereby the fuel lid cover 32 can be temporarily fastened to the step portion 152B side.

That is, a positional relationship between the male screw component such as the bolt 51, and the female screw component such as a nut may be reversed. In this case, the male screw component protrudes from the vehicle body 10 side (the door inner plate side), and therefore the configuration illustrated in FIG. 9 or the like in which the protruding portion from the vehicle body 10 side is only the step portion 152B is more preferable.

Each of the embodiments described above is only one mode for carrying out the present invention, and modification and application can be arbitrarily made within the range without departing from the gist of the present invention.

For example, in the aforementioned first embodiment, the case of using the penetration type rivet nut that penetrates in the axial direction from the tip end to the base end is described, but the present invention is not limited to this.

Figure 10:
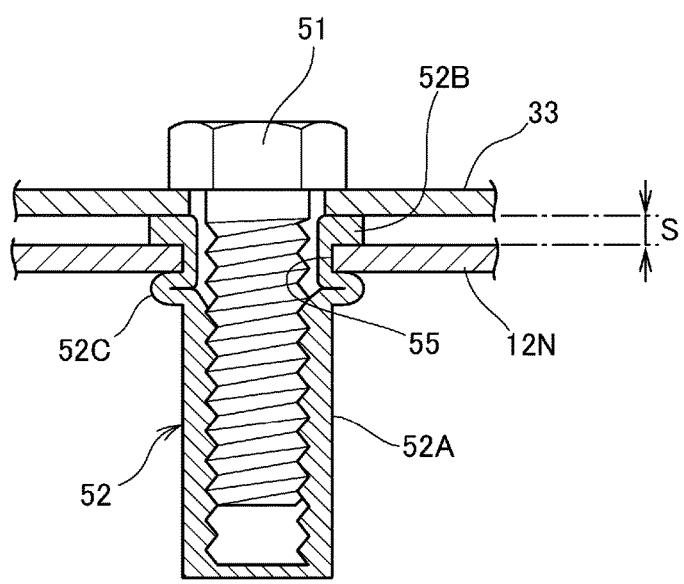
FIG. 10 is a side sectional view illustrating a modified example of the rivet nut with a peripheral configuration.

FIG. 10 is a side sectional view illustrating a modified example of the rivet nut 52 with a peripheral configuration.

As illustrated in FIG. 10, the rivet nut 52 is formed to have a bottom with a tip end of the nut portion 52A closed, and is also referred to as a shield nut. The rivet nut 52 with the bottom is of a non-penetration type that does not penetrate in the axial direction, and therefore even if water or the like from the outside enters, the water or the like does not enter into the rear door 12 or the like by passing through the rivet nut 52. Thereby, it becomes possible to take the measure against water leakage without using a seal member (including a bolt) that prevents communication of the rivet nut 52. Note that whether or not to use the rivet nut 52 with the bottom may be decided with total cost including the seal member or the like taken into consideration.

Further, in each of the embodiments described above, the case of setting any one of the rear door 12, the front door 11 and the tailgate 13 to be the temporary fastening position is described, but the temporary fastening position is not limited to this, and may be the opening portion around a windshield. Further, in a case of a vehicle body of a sedan type or the like without having a tailgate, the temporary fastening position may be an opening portion around a rear window glass or a trunk lid.

Further, the case of using the bolt 51 as the fastening member for temporarily fastening the fuel lid cover 32 to the vehicle body 10 is described, but the kind of the fastening member is not limited to the bolt, but may be a vis, for example. Further, a material of the fastening member is not limited either, and an iron, an alloy, a resin or the like may be applicable, for example.

Further, in each of the embodiments described above, the case of applying the present invention to the case of coating the fuel lid cover covering the fuel filling port 31 by temporarily fastening the fuel lid cover to the vehicle body is described, but the present invention is not limited to this. In a case of having another fuel supply port except for the fuel filling port 31, the present invention is applicable when a lid cover that covers the fuel supply port is coated by being temporarily fastened to the vehicle body. The other fuel supply port is, for example, a supply port for gas, or a connector for electric power supply.

Further, in each of the embodiments described above, the case of applying the present invention to the case of coating the fuel lid cover by temporarily fastening the fuel lid cover to the vehicle body is described, but the present invention is not limited to this, and the present invention is applicable to a case of coating a component that is assembled to the vehicle body other than the fuel lid cover by temporarily fastening the component to the vehicle body. For example, in a case of the vehicle body having a sunroof, it is possible to apply the present invention when the sunroof is coated by being temporarily fastened to the vehicle body. Further, in each of the embodiments described above, the case of coating that applies electrodeposition coating, intermediate coating, and final coating is described, but the coating is not limited to this coating.

REFERENCE SIGNS LIST

10 Vehicle body
11 Front door
11A, 11B Door main body
11B, 12B, 13B Window opening portion
12 Rear door
12N Door inner plate
13 Tailgate
13A Tailgate main body
31 Fuel filling port (fuel supply port)
32 Fuel lid cover (component)
33 Hinge
33K Opening portion
35 Fuel lid cover unit
51 Bolt (fastening member)
52, 152 Rivet nut
52A Nut portion
52B Flange portion (step portion)
152B Step portion
S space

What is claimed is:

1. A vehicle body structure for temporarily fastening a component that is assembled to a vehicle body, to the vehicle body in a position different from a predetermined assembling position, and coating the component simultaneously with the vehicle body,
   wherein the component is provided with an opening portion for assembling the component to the vehicle body, and the component is temporarily fastened to the vehicle body with use of the opening portion, and
   a step portion that forms a space between the component and the vehicle body when the component is temporarily fastened to the vehicle body is provided, and
   wherein the step portion is formed by a flange portion of a rivet nut that is attached to the vehicle body.

2. The vehicle body structure according to claim 1,
   wherein the step portion is provided at a door inner plate of the vehicle body or a tailgate inner plate.

3. The vehicle body structure according to claim 1,
   wherein the step portion is provided at a side having a fuel supply port, of a left and a right of the vehicle body.

4. The vehicle body structure according to claim 1, wherein the rivet nut has a bottom with a tip end of the rivet nut closed.

5. The vehicle body structure according to claim 1,
   wherein the rivet nut is provided with a seal member that prevents communication of the rivet nut.

6. The vehicle body structure according to claim 1,
   wherein the component is a fuel lid cover that is provided with a hinge for assembling the component to the predetermined assembling position.

7. A coating method for a vehicle body that is a method of temporarily fastening
   a component that is assembled to the vehicle body, to the vehicle body in a position different from a predetermined assembling position, and coating the component simultaneously with the vehicle body, comprising:
   a temporary fastening step of temporarily fastening the component to the vehicle body by using an opening portion that is provided in the component and is for assembling the component to the vehicle body, and having a space formed by a step portion that forms the space between the component and the vehicle body at a time of the component being temporarily fastened; and
   a coating step of applying electrodeposition coating, intermediate coating and final coating to the vehicle body,
   wherein in the temporary fastening step, the component is temporarily fastened to the vehicle body by a fastening member, and
   the fastening member is detached after the coating step, and after the component is detached, the fastening member is refastened to a same spot of the vehicle body.

* * * * *